(12) United States Patent
Yang et al.

(10) Patent No.: US 8,424,830 B2
(45) Date of Patent: Apr. 23, 2013

(54) HOLDER FOR TABLET PERSONAL COMPUTER

(75) Inventors: Hsin-Yung Yang, New Taipei (TW); Li-Houng Lu, New Taipei (TW); Ching-Min Lin, New Taipei (TW); Tzu-Cheng Yu, Santa Clara, CA (US)

(73) Assignee: Chi Mei Communications Systems, Inc., New Taipei (TW)

( * ) Notice: Subject to any disclaimer, the term of this patent is extended or adjusted under 35 U.S.C. 154(b) by 28 days.

(21) Appl. No.: 13/294,577

(22) Filed: Nov. 11, 2011

(65) Prior Publication Data

US 2012/0248277 A1    Oct. 4, 2012

(51) Int. Cl.
*A47B 97/04* (2006.01)

(52) U.S. Cl.
USPC .............. 248/459; 248/460; 40/750

(58) Field of Classification Search .......... 40/750, 40/754, 755; 211/73, 42, 43; 206/767, 768, 206/45.24, 45.25, 45.27; 248/457, 463, 465, 248/461, 458, 447, 448, 459, 460
See application file for complete search history.

(56) References Cited

U.S. PATENT DOCUMENTS

| | | | | |
|---|---|---|---|---|
| 3,438,698 A | * | 4/1969 | Triggs | 359/803 |
| 4,579,232 A | * | 4/1986 | Fedak | 211/50 |
| 5,083,663 A | * | 1/1992 | Conway et al. | 206/45.26 |
| 5,165,649 A | * | 11/1992 | Neumann et al. | 248/459 |
| 5,301,800 A | * | 4/1994 | Kenney | 206/449 |
| 7,185,869 B2 | * | 3/2007 | Smith | 248/456 |
| D674,396 S | * | 1/2013 | Yang et al. | D14/447 |
| 2006/0285283 A1 | | 12/2006 | Simonian et al. | |
| 2011/0068245 A1 | | 3/2011 | Livingston et al. | |
| 2013/0026329 A1 | * | 1/2013 | Lane et al. | 248/459 |

FOREIGN PATENT DOCUMENTS

EP    0335258 A2    10/1989

OTHER PUBLICATIONS

Squirrel, "Origami Ipad Sleeve From Incase," Gaygadget (Nov. 4, 2010).

* cited by examiner

*Primary Examiner* — Alfred J Wujciak
(74) *Attorney, Agent, or Firm* — Altis Law Group, Inc.

(57) ABSTRACT

A holder for holding a portable electronic device can be changed between a folded position and an unfolded position. The holder holds the portable electronic device in the folded position. In the unfolded position, the holder has its supporting board, front holding board, rear holding board, side holding boards, bottom holding boards substantially planar with each other. In the folded position, the supporting board supports the side holding boards to vertically stand, the rear holding board is secured above the supporting board at an obtuse angle, and the front holding board is maintained parallel with the rear holding board.

16 Claims, 6 Drawing Sheets

HOLDER FOR TABLET PERSONAL COMPUTER

BACKGROUND

1. Technical Field

The present disclosure relates to holders, and particular to a holder for a portable electronic device such as a tablet personal computer.

2. Description of the Related Art

Tablet Personal Computer (hereinafter portable electronic device), for example may be held at an angle by a holder for easy touching and a comfortable viewing. However, the holder usually has a complex structure and not easy to carry.

Therefore, there is room for improvement within the art.

BRIEF DESCRIPTION OF THE DRAWINGS

Many aspects of the present holder can be better understood with reference to the following drawings. The components in the drawings are not necessarily drawn to scale, the emphasis instead being placed upon clearly illustrating the principles of the present holder. Moreover, in the drawings, like reference numerals designate corresponding parts throughout the several views.

DETAILED DESCRIPTION

Figure 3:
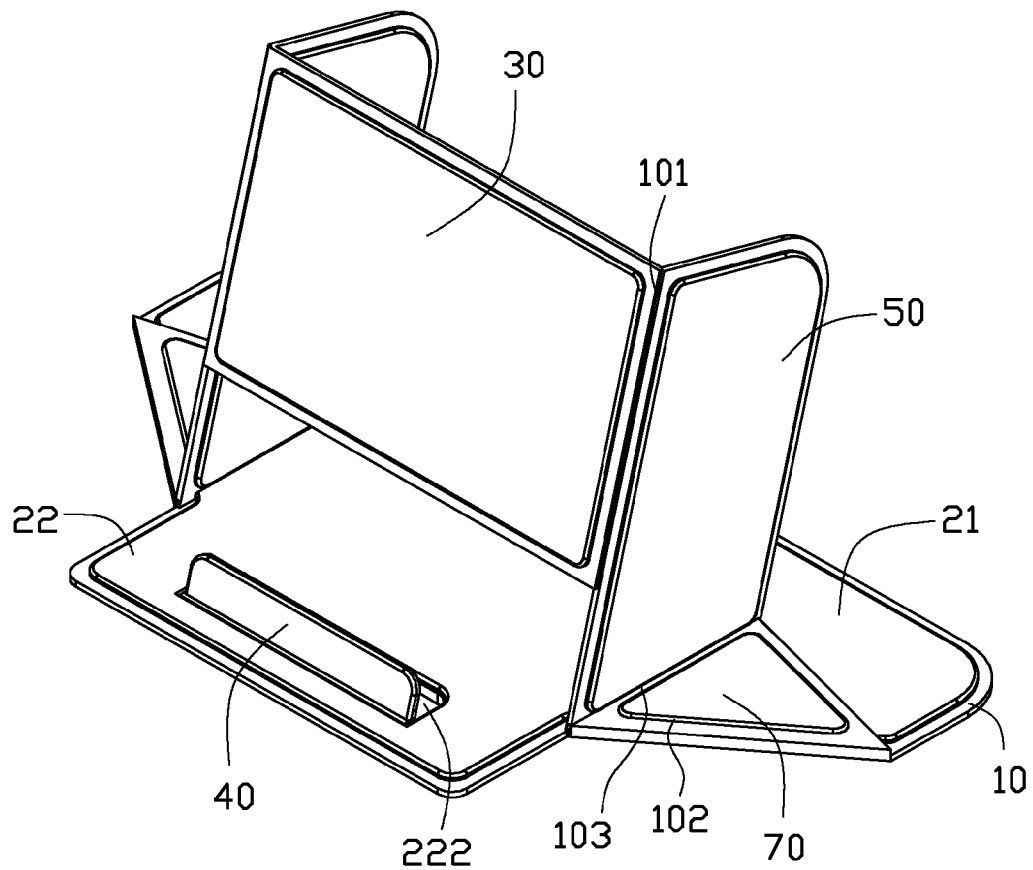
FIG. 3 is an isometric view of the holder shown in FIG. 1 in a folded position.
Figure 4:
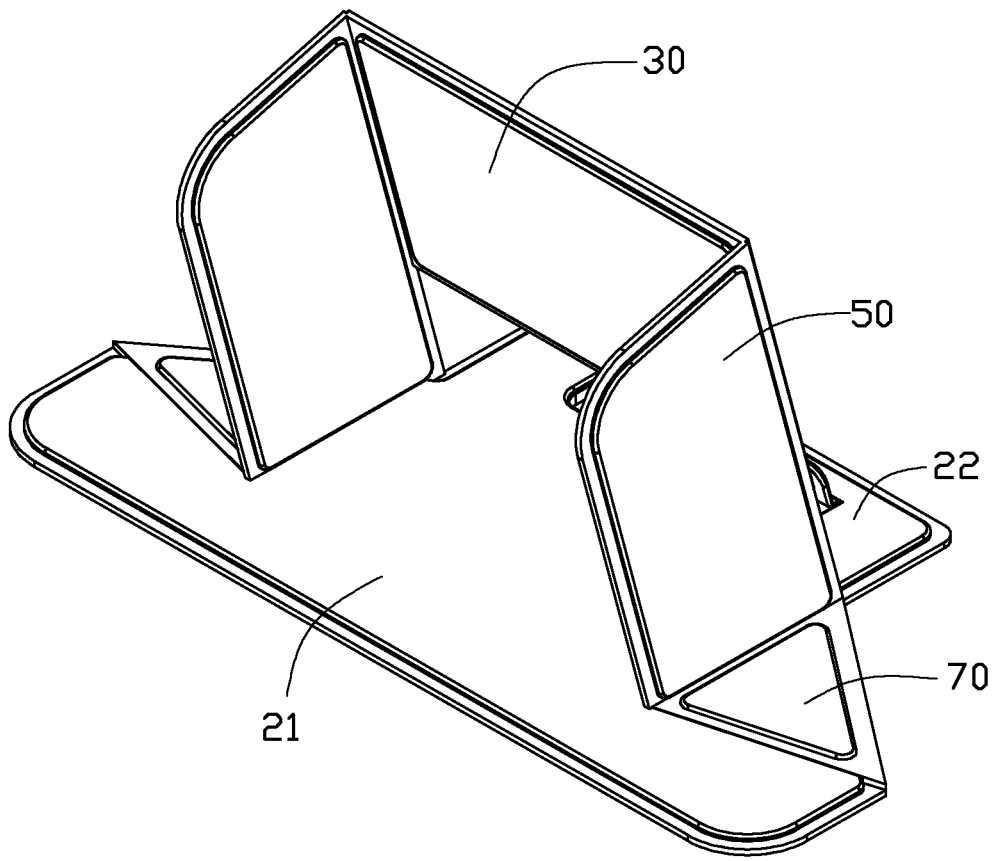
FIG. 4 is similar to FIG. 3, but viewed from another angle.
Figure 5:
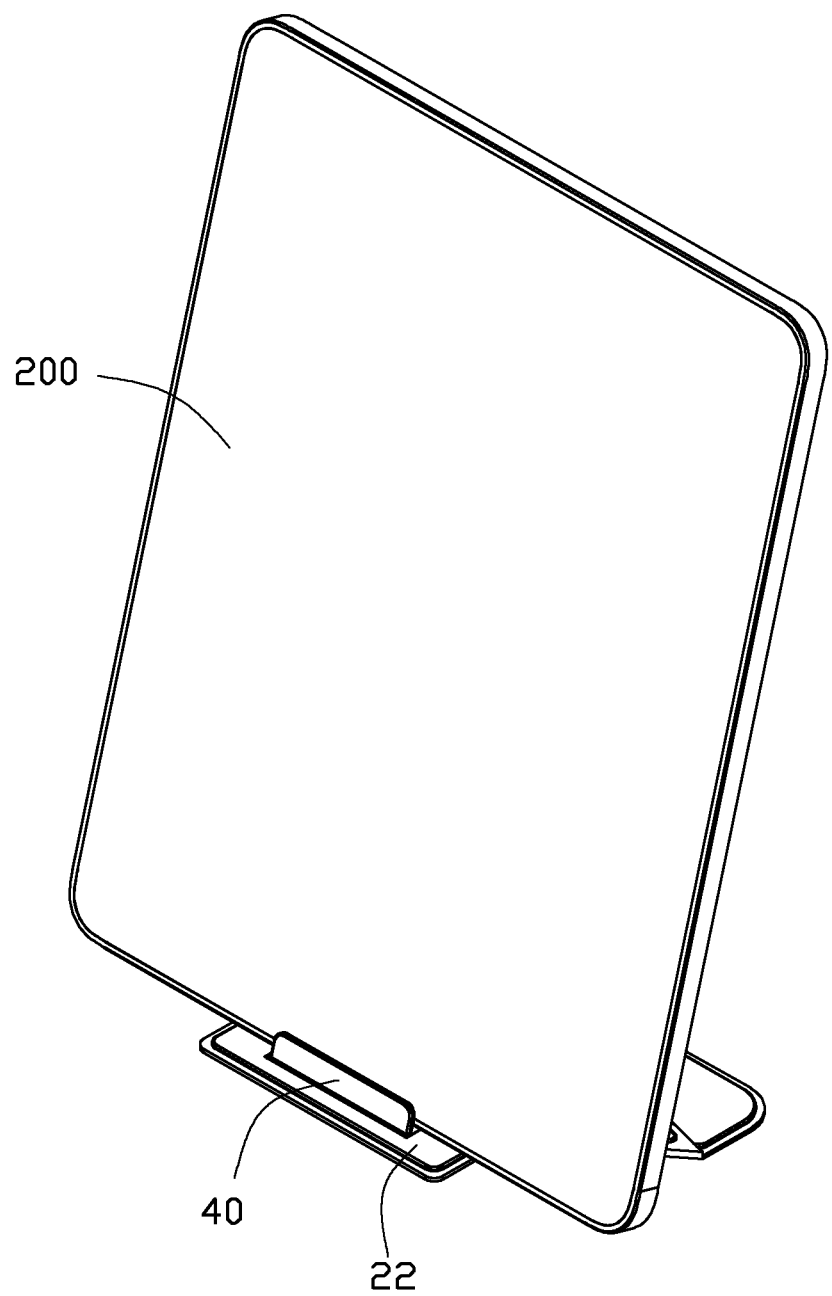
FIG. 5 is an isometric view showing the portable electronic device held by the holder shown in FIG. 3.
Figure 6:
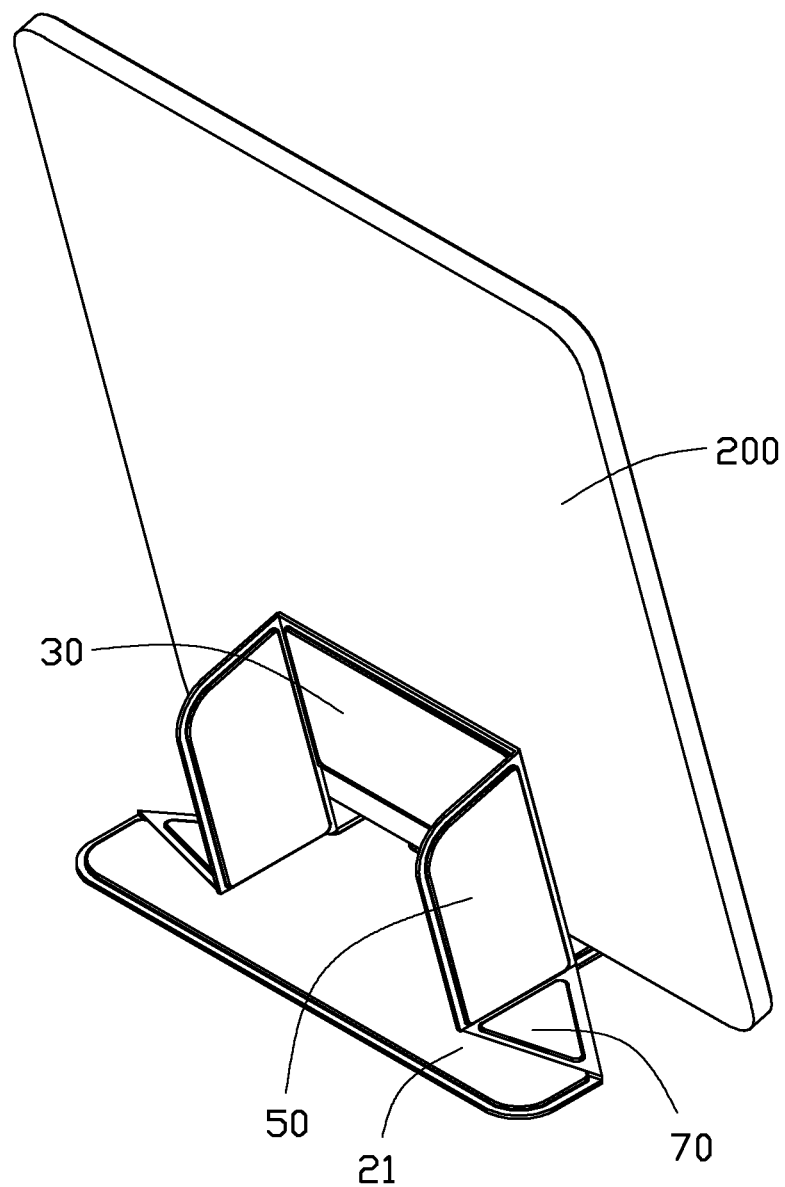
FIG. 6 is similar to FIG. 5, but viewed from another angle.

FIGS. 1-4 show an exemplary embodiment of a holder 100 and FIGS. 5-6 show the holder 100 holding a portable electronic device 200 such as tablet personal computer.

Figure 1:
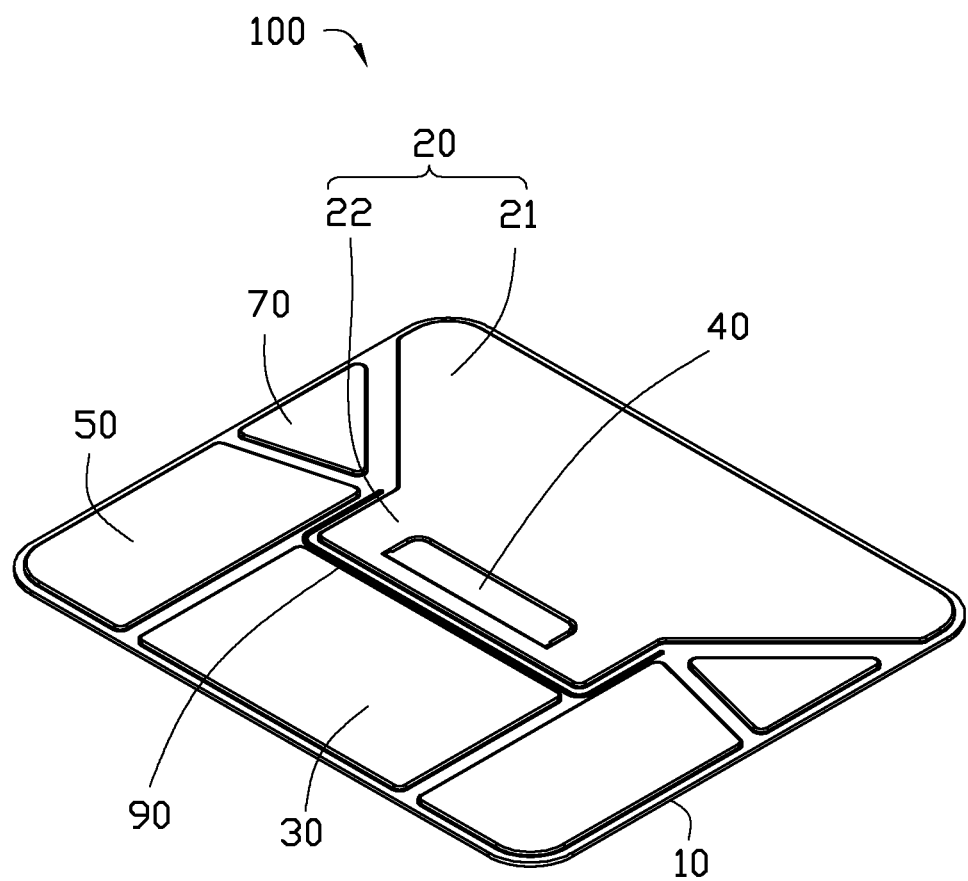
FIG. 1 is an isometric view of a holder for a portable electronic device in an unfolded position according to an exemplary embodiment.
Figure 2:
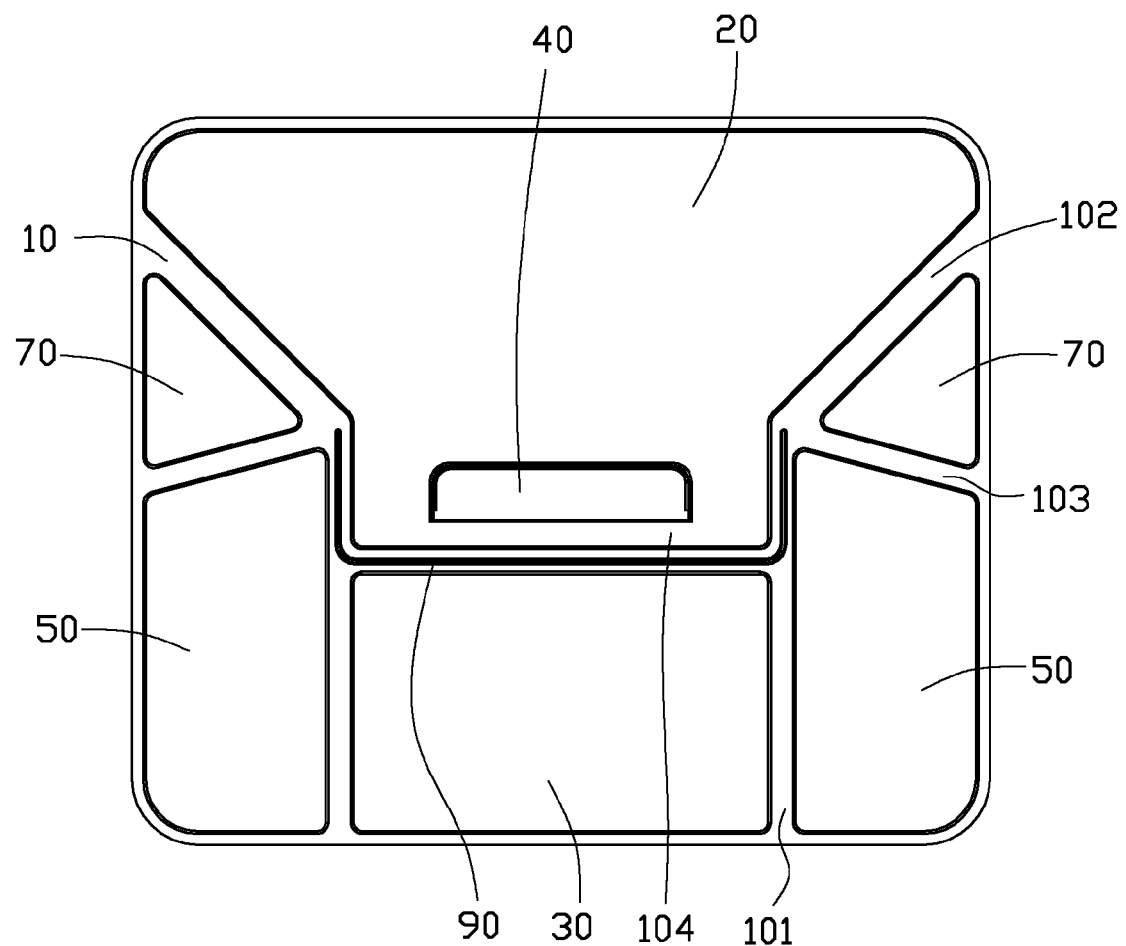
FIG. 2 is a top planar view of the holder shown in FIG. 1.

FIGS. 1-2 show the holder 100 in an unfolded position where all of the included elements are substantially coplanar with each other. The holder 100 includes a base member 10 at the bottom. The base member 10 has a supporting board 20, a rear holding board 30, a front holding board 40, two side holding boards 50, two bottom holding boards 70 attached (e.g., magnetically attached by magnets) on the same surface. All of the boards 20, 30, 40, 50, 70 may be embedded in the same surface of the base member 10.

The base member 10 is foldable and thus the holder 100 can be changed between the unfolded position (FIG. 1) and the folded position (FIG. 3). The base member 10 may be made of flexible materials such as man-made fiber. The supporting board 20, the rear holding board 30, the side holding boards 50 and the bottom holding boards 70 are rigid and may be made of plastics such as polythene for holding the portable electronic device 200 in the folded position.

The supporting board 20 includes a generally trapezoid-shaped first supporting section 21 and a generally rectangular second supporting section 22 connecting the first supporting section 21. The second supporting section 22 is generally positioned at the center of the base member 10, and laterally defines a through slot 222 substantially parallel to the bottom side of the first supporting section 21. The front holding board 40 has substantially the same shape as the through slot 222 so the front holding board 40 is received in the through slot 222 to attach to a fourth folding section 104 of the base member 10 which is exposed by the through slot 222 (see FIG. 2). Also, the front holding board 40 can be rotated out of the through slot 222 by folding the fourth folding section 104.

The rear holding board 30 is generally rectangular and is positioned above the second supporting section 22. Two side holding boards 50 are generally rectangular and are symmetrically positioned at two opposite sides of the rear holding board 30. The second supporting section 22 is positioned between two side holding boards 50. Two bottom holding boards 70 are generally triangular and are symmetrically positioned at two sides of the supporting board 20. Also, each bottom holding board 70 is located between the corresponding one side holding board 50 and the supporting board 20.

Thus, as best shown in FIG. 2, the rear holding board 30 is located between and adjacent to two side holding boards 50, defining two exposed opposite first foldable sections 101 of the base member 10. Each one of the bottom holding boards 70 is adjacent to the corresponding side of the supporting board 20, defining two exposed opposite second foldable sections 102 of the base member 10. Each one of the bottom holding boards 70 is located adjacent to corresponding one of the side holding boards 50, defining two exposed opposite third foldable sections 103 of the base member 10. The base member 10 further defines a generally U-shaped hole 90 around the second supporting section 22. The hole 90 is exposed and has its two vertical sections located between the side holding boards 50 and the second supporting section 22, and its horizontal section located between the rear holding board 30 and the second supporting section 22.

When using the holder 100 for holding the portable electronic device 200, the holder 100 is required to change from the unfolded position of FIGS. 1-2 to the folded position of FIGS. 3-4. During the process, two bottom holding boards 70 can be lifted and rotated towards the center of the first supporting section 21, folding the second foldable section 102. Correspondingly, two side holding boards 50 are lifted and rotated towards each other. Also, the rear holding board 30 is lifted and rotates away from the supporting board 20. In this case, the first foldable section 101 and the third foldable section 103 are folded.

When the bottom holding boards 70 attach and cover the first supporting section 21, the bottom holding boards 70 and the supporting board 20 are folded as a whole. Accordingly, the movement of the rear holding board 30 and the side holding boards 50 is stopped. The first supporting section 21 resists against and supports the side holding boards 50 to vertically stand at an angle of 90 degrees. The rear holding board 30 is secured above the supporting board 20 at an obtuse angle by the side holding boards 50, exposing the entire of the second supporting section 22. When folding the fourth foldable section 104, the front holding board 40 can rotate out of the through slot 222 to be parallel with the rear holding board 30. Thus, the folded position of the holder 100 is achieved for holding the portable electronic device 200.

FIGS. 5 and 6 show the portable electronic device 200 can be held by the holder 100. The portable electronic device 200 has its bottom end resisting against the second supporting section 22 and the front holding board 40, and further has its rear surface supported by the rear holding board 30, the side holding boards 50, the bottom holding boards 70, and the first supporting section 21.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A holder for holding a portable electronic device, comprising:
   a base member being foldable and defining a hole;
   a supporting board attached to the base member;
   a front holding board attached to the base member and rotatable relative to the supporting board;
   a rear holding board attached to the base member, adjacent to and above the supporting board;
   two side holding boards attached to the base member, adjacent to and at two opposite sides of the rear holding board;
   two bottom holding boards attached to the base member, each one of the bottom holding boards positioned adjacent to and between corresponding one side holding boards and the supporting board;
   wherein, the hole is defined between the supporting board and the rear holding board, so that the rear holding board can rotate relative to the supporting board, driving the bottom holding boards and the side boards to rotate relative to the supporting board.

2. The holder as claimed in claim 1, wherein the supporting board includes a first supporting section and a second supporting section connecting to the first supporting section, the second supporting section defines a through slot receiving the front holding board.

3. The holder as claimed in claim 2, wherein the hole is defined around the second supporting section.

4. The holder as claimed in claim 3, wherein the base member defines two first foldable sections between the side holding boards and the rear holding board.

5. The holder as claimed in claim 4, wherein the base member defines two second foldable sections between the bottom holding boards and the first supporting section.

6. The holder as claimed in claim 5, wherein the base member defines two third foldable sections between the side holding boards and the bottom holding boards.

7. The holder as claimed in claim 1, wherein the base member is made of flexible materials.

8. The holder as claimed in claim 1, wherein the supporting board, the rear holding board, the side holding boards, and the bottom holding boards are made of plastics.

9. A holder for holding a portable electronic device, transferable between a folded position and an unfolded position, the holder holding the portable electronic device in the folded position, the holder comprising:
   a base member being foldable;
   a supporting board attached to the base member;
   a front holding board attached to the base member;
   a rear holding board attached to the base member;
   two side holding boards attached to the base member;
   two bottom holding boards attached to the base member;
   wherein:
   in the unfolded position, the supporting board, the front holding board, the rear holding board, the side holding boards, the bottom holding boards are substantially planar with each other;
   from one of the unfolded position and the folded position to the other, the front holding board, the rear holding board, the side holding boards, the bottom holding boards can rotate relative to the supporting board;
   in the folded position, the supporting board resists against and supports the side holding boards to vertically stand, the rear holding board is secured above the supporting board at an obtuse angle by supporting of the side holding boards, the front holding board is maintained parallel with the rear holding board.

10. The holder as claimed in claim 9, wherein the supporting board includes a first supporting section and a second supporting section connecting to the first supporting section, the second supporting section defines a through slot receiving the front holding board.

11. The holder as claimed in claim 10, wherein the hole is defined between the supporting board and the rear holding board, and around the second supporting section.

12. The holder as claimed in claim 11, wherein the base member defines two first foldable sections between the side holding boards and the rear holding board.

13. The holder as claimed in claim 12, wherein the base member defines two second foldable sections between the bottom holding boards and the first supporting section.

14. The holder as claimed in claim 13, wherein the base member defines two third foldable sections between the side holding boards and the bottom holding boards.

15. The holder as claimed in claim 9, wherein the base member is made of flexible materials.

16. The holder as claimed in claim 9, wherein the supporting board, the rear holding board, the side holding boards, and the bottom holding boards are made of plastics.

\* \* \* \* \*